United States Patent [19]

Manning

[11] Patent Number: 5,456,737
[45] Date of Patent: Oct. 10, 1995

[54] SOIL SUPPLEMENT AND METHOD OF MANUFACTURE

[75] Inventor: Harold J. Manning, Pasco, Wash.

[73] Assignee: Cerad Industries, Inc., Oklahoma City, Okla.

[21] Appl. No.: 142,685

[22] Filed: Oct. 26, 1993

Related U.S. Application Data

[63] Continuation-in-part of Ser. No. 131,492, Oct. 4, 1993, Pat. No. 5,372,314.

[51] Int. Cl.⁶ ..................................................... C05F 5/00
[52] U.S. Cl. .......................... 71/16; 71/23; 71/25; 241/21
[58] Field of Search ..................... 71/16, 21, 23, 71/25; 241/21

[56] References Cited

U.S. PATENT DOCUMENTS

| | | | |
|---|---|---|---|
| 3,271,161 | 9/1966 | Eshleman | 424/724 |
| 4,187,141 | 2/1980 | Ahrel | 162/23 |
| 4,279,895 | 7/1981 | Carle | 424/602 |
| 4,799,961 | 1/1989 | Friberg | 106/93 |
| 4,813,996 | 3/1989 | Gardner et al. | 71/21 |
| 5,028,299 | 7/1991 | Guidat et al. | 162/24 |
| 5,087,400 | 2/1992 | Theuveny | 264/115 |

FOREIGN PATENT DOCUMENTS

| | | | |
|---|---|---|---|
| 5544355 | 3/1980 | Japan | C02F 11/00 |
| 0070086 | 6/1981 | Japan | 71/23 |
| 0221383 | 10/1985 | Japan | 71/23 |

OTHER PUBLICATIONS

Southwell Laboratory; Certificate of Analysis, Date reported Jul. 16, 1993.
Southwell Laboratory; Certificate of Analysis, Date reported Sep. 21, 1993.
National Lime Association, *Chemical Lime Facts*, Sixth Edition, 1992.

*Primary Examiner*—Ferris Lander

[57] ABSTRACT

A soil supplement and method of manufacturing same in which waste cellulosic fibrous material, such as waste paper, is finely shredded after which any metal component is removed and the shredded material is then thoroughly mixed with an agricultural wetting agent and a milk of lime until a temperature of about 120° to 140° F. is achieved after which a material selected from the group comprising silica diatomite plankton and non-swelling clay is added and the mixture is neutralized to a pH of about 7.

9 Claims, 1 Drawing Sheet

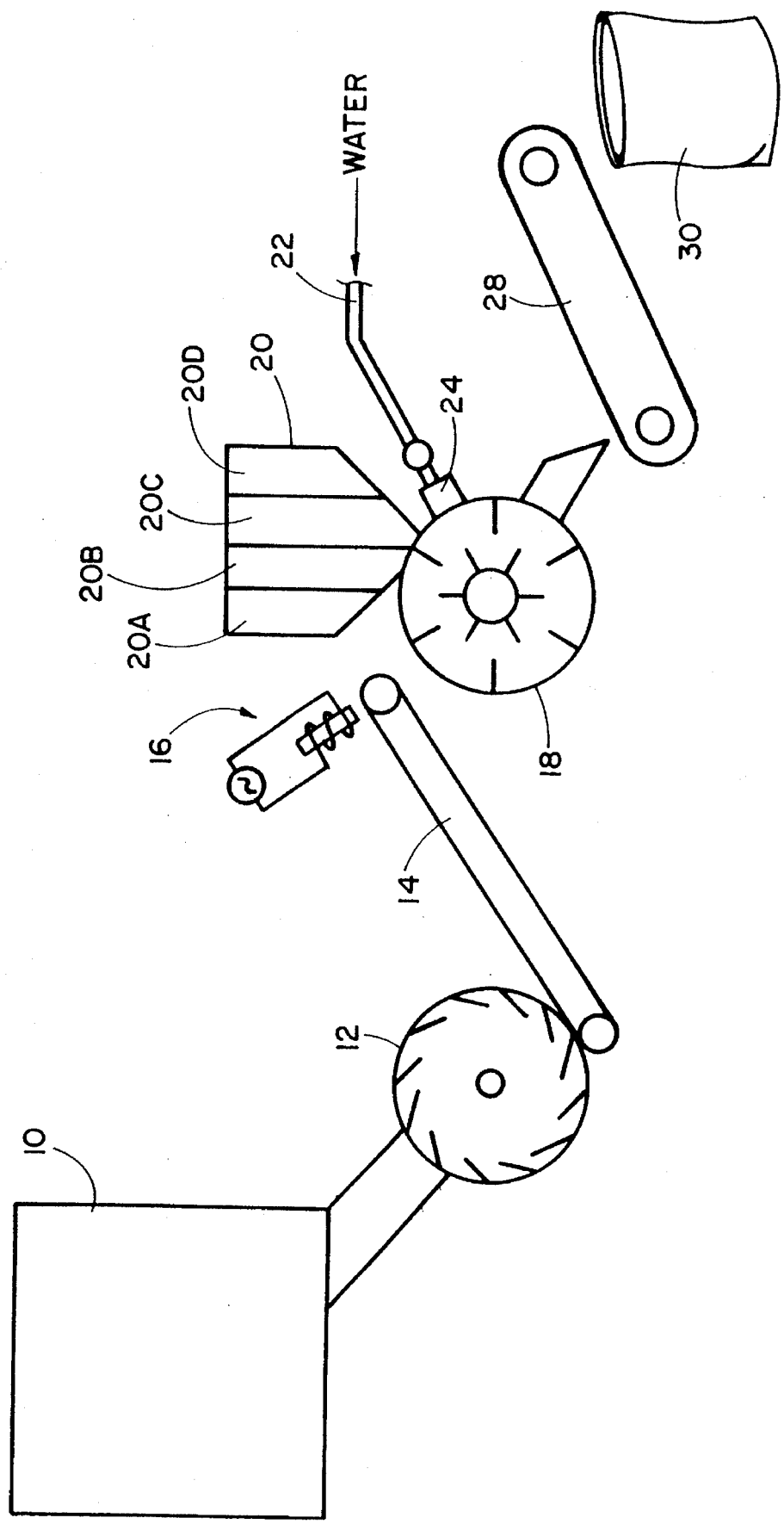

SOIL SUPPLEMENT AND METHOD OF MANUFACTURE

This is a continuation-in-part of application Ser. No. 08/131,492 filed on Oct. 4, 1993, now U.S. Pat. No. 5,372,314, Dec. 13, 1994.

BACKGROUND OF THE INVENTION

Cultivation of crops and plants is not possible, or economically feasible, in many areas of this country and abroad. Some locales, particularly within arid climates, are prone to have dry, compacted soils not suitable to root development, plant growth and maintenance. Areas that normally receive little rainfall or regions stricken by drought are also likely to have soils which are parched and dense, as are tracts disadvantaged by a sloping topography. Besides having a poor texture, the soil in these territories is also apt to be depleted in the minerals essential to plant development. Lands above aquifers or other underground water structures are also candidates for mineral depletion, as vital elements in the soil leach into the underground waters and are swept away. Soil conservation is further hampered by chemical pollution caused by industry, high levels of automobile emissions and illegal dumping. This problem of poor soil composition extends to the nursery and gardening industries, as well as to the potted plants of the "week-end" gardener.

Long used in soil management to bolster the receptivity of soil to crops and plants are a variety of soil supplements, such as peat moss, fertilizers and mulches. However, the use of these soil supplements leaves something to be desired. Peat moss, for instance, is much too expensive to make its use economically feasible on a large scale. And fertilizers, if used in areas predisposed to leaching, pass straight through the soil and are washed away. Mulches, especially of the backyard "home-cooked" type, do not serve to adequately replenish nutrients lost by the soil.

A more general problem exists throughout the world in connection with the disposal of waste products, particularly waste paper and waste cardboard. If placed in large quantities in landfills, waste paper degrades very, very slowly, particularly if disposed of in normal compacted form. The expense of shredding waste paper prior to disposal in a landfill has been too high to make it economically feasible to require all waste paper and waste cardboard to be shredded before disposal; and even if shredded, the shredded material becomes highly compacted, and, if covered with earth, it biodegrades very slowly.

For these reasons, there exists a need for an improved soil supplement that can be made employing a product, which within itself constitutes a waste disposal problem (waste paper), that not only loosens and improves the texture of dry, compacted soils, but that also retains moisture in the ground, reduces the leaching of nutrients into aquifers and the like, and adds essential nutrients to the soil.

SUMMARY OF THE INVENTION

This invention provides a highly effective soil supplement, and method of manufacturing same, employing readily available waste components and other inexpensive and readily available materials. The soil supplement is manufactured employing the steps as follows:

(1) Waste cellulosic fibrous material, such as waste paper, cardboard, or so forth, is finely shredded to obtain a shredded fiber. In a preferred practice of the invention, the material, such as waste paper, is shredded to a size wherein the average dimension of the shredded components is about 500 to 1000 microns.

(2) The finely shredded fibrous material is passed through a separator wherein any metal components are removed. The metal extraction step is accomplished utilizing a magnetic separator—a process well known in the industry.

(3) The demetalled shredded fiber of step (2) is then mixed with an agricultural wetting agent and a milk of lime until a temperature of 120° F. to 140° F. is achieved to obtain a first mixture in the form of a slurry.

(4) Mixed with the first mixture slurry of step (3) is a material selected from the group comprising silica diatomite plankton (diatomaceous earth) and non-swelling clay to obtain a second mixture.

(5) To the second mixture of step (5) is then added a pH modifying substance, such as humic acid, fulvic acid, leonardite or lignite, in an amount sufficient to neutralize the second mixture to a pH of about 7 to obtain a finished soil supplement.

The finished soil supplement of step (5) is a completely organic product that, when mixed with topsoil, functions to hold three to four times its weight in moisture. In addition, the finished soil supplement replenishes the soil with nitrogen, siliceous elements and calcium while preventing the leaching away of these vital nutrients. As the soil supplement composts with the topsoil, it becomes a natural source of fiber that works to loosen the texture of the soil. Further, by using waste paper as its unique source of fiber, the soil supplement is economical to manufacture and use on a large scale.

Diatomaceous silica has previously been used for forming insecticidal compositions such as revealed in U.S. Pat. No. 4,279,895 issued to Arthur Carle entitled "Insecticidal Natural Bait Composition and Method of Using Same". Further, the use of diatomaceous earth in poultry feed is disclosed in U.S. Pat. No. 3,271,161 issued Sep. 6, 1966 to John C. Eshleman entitled "Poultry Feed Containing About 1% Diatomaceous Earth". Diatomaceous earth has also been used by this inventor in his method of treating waste cellulosic fiber sludge to form a useable, environmentally safe filler material, for which copending application for patent has been made as Ser. No. 08/087,193, filed Jul. 2, 1993, in his method of manufacturing animal bedding, currently the subject of a copending U.S. Patent application filed Oct. 4, 1993, and in his application for patent Ser. No. 08/142,680 entitled Floor Dry Material and Method of Manufacture, filed on the same day as the instant application.

A better understanding of the invention will be obtained from the following description, taken in conjunction with the attached drawing.

BRIEF DESCRIPTION OF THE DRAWINGS

The drawing illustrates diagrammatically the sequence of steps employed in the method of this invention for manufacturing soil supplement.

DETAILED DESCRIPTION OF THE PREFERRED EMBODIMENT

Referring to the drawing, the element number 10 indicates a source of waste cellulosic fibrous material that can be in the form of waste paper or waste cardboard, or any similar inexpensive source of cellulosic fibrous material. A serious problem in the world today is the disposal of waste paper and waste cardboard. Some of such waste materials are recycled for the use in making recycled paper. However, such processes are not highly economical, and today only a relatively small percent of waste paper or waste cardboard is processed in a manner to be recycled for making new paper or new cardboard. The composition and method of this invention make good use of such readily available waste paper and waste cardboard.

The waste fibrous material from source 10 is conveyed to a shredder 12 wherein the material is finely shredded. Industrial waste paper shredders are commercially available. In the preferred practice of the invention, the waste fibrous material should be shredded so that the particle size of the shredded fibrous material on the average has a dimension of about 500 to 1000 microns.

The shredded fibrous material is fed to a conveyor 14, or other similar device, where it is carried to a magnetic separator station or other metal separator, indicated generally by the numeral 16, wherein any metal component of the shredded fibrous material is removed. Should, however, the shredded fibrous material be assuredly devoid of metal components, the shredded material need not be carried through the magnetic separator. The demetalled shredded fibrous material is deposited from conveyor 14 into a reactor 18. In reactor 18 an agricultural wetting agent and a milk of lime are added to the demetalled shredded fibrous material.

The agricultural wetting agent, several are known in the art, is added to reactor 18 from a first portion 20A of a feeder 20. The wetting agent functions to emulsify kaolins present in the demetalled shredded fibrous material and to dissolve and breakdown the cellulosic material into a true fiber form. In the preferred composition and method, the ratio by dry weight of the wetting agent to the demetalled shredded fibrous material ranges from about 0.001 to 1 up to 0.005 to 1.

The milk of lime consists of a water stream and calcium oxide. Water from a source 22 is fed into reactor 18 in conjunction with a moisture control apparatus 24. In the preferred composition and method, the ratio by weight of the water to the demetalled shredded fibrous material ranges from about 0.67 to 1 up to 1.34 to 1. The calcium oxide is added to reactor 18 from a second portion 20B of a feeder 20. In the preferred composition and method, the ratio by weight of the calcium oxide to the demetalled shredded fibrous material ranges from about 0.15 to 1 up to 0.45 to 1. In another embodiment, the calcium oxide is added to the water stream via a volume powder mixer. The wetting agent, calcium oxide, water and demetalled shredded fibrous material are thoroughly mixed within reactor 18 until a temperature of about 120° F. to 140° F. is achieved. The reaction of the wetting agent, calcium oxide, water and demetalled shredded fibrous material is exothermic so that the desired temperature can be achieved without the addition of heat to the reaction.

After the reaction of the wetting agent, calcium oxide, water and demetalled shredded fibrous material has been carried out sufficiently to obtain the desired temperature and to obtain a first mixture slurry, there is added thereto and thoroughly mixed in reactor 18 from a third portion 20C of feeder 20 a non-swelling clay or diatomaceous earth in an amount sufficient to dry and fluff the first mixture slurry to obtain a second mixture. In the preferred composition and method, the ratio by weight of clay or diatomaceous earth to demetalled shredded fibrous material ranges from about 0.5 to 1 up to 1.5 to 1.

To the second mixture in reactor 18 is then added and thoroughly mixed a pH modifying substance in an amount sufficient to neutralize the second mixture to a pH of about 7 to obtain a finished soil supplement. The pH modifying substance is added to reactor 18 from a fourth portion 20D of feeder 20. Preferably the pH modifying substance will be in a liquid carrier form. Humic acid, fulvic acid, leonardite and lignite are recommended.

The finished soil supplement is then passed from reactor 18 to a conveyor 28 where it can be passed on for storage or packaging 30.

EXAMPLE

This example is set forth for purposes of illustrating the above-described composition and method of manufacture. Starting with 250 lbs. of waste cellulosic fibrous material obtained from source 10, the material is conveyed to shredder 12 wherein the material is finely shredded to a size of about 500 to 1000 microns. The shredded material is fed to conveyor 14 where it is carried to the magnetic separator station 16 wherein any metal component of the shredded material is removed. The demetalled shredded material is deposited from conveyor 14 into reactor 18. In reactor 18 from first portion 20A of feeder 20 is added approximately 5 ounces of a suitable agricultural wetting agent. 30 gallons water from source 22 is fed into reactor 18 through the moisture control apparatus 24. 75 lbs. of calcium oxide is also added to reactor 18 from second portion 20B of feeder 20. The wetting agent, calcium oxide, water and demetalled shredded material are thoroughly mixed within reactor 18 until a temperature of about 120° F. to 140° F. is achieved. After the desired temperature is achieved and a first mixture slurry is obtained, there is added thereto in reactor 18 from third portion 20C of feeder 20 250 lbs. of a non-swelling clay or diatomaceous earth to obtain a second mixture. To the second mixture is then added from fourth portion 20D of feeder 20 a liquid humic and fulvic acid combination in an amount sufficient to neutralize the second mixture to a pH of about 7 to obtain a finished soil supplement. The finished soil supplement is then passed from reactor 18 to a conveyor 28 where it is passed on for storage or packaging 30.

The soil supplement thus described is economical to manufacture. Further, the soil supplement aids in the retention of moisture in the soil and functions to increase soil stability, allowing for the natural bacterial action required for plant food conversion and nitrogen fixing by hydrocarbon to protein transfer. Use of the soil supplement will also reduce excess leaching from the soil of the natural humic and fulvic acids and amines essential to plant development and growth. The soil supplement is a completely recycled product making a very unique use of waste paper. All components of the soil supplement are organic, and thus biodegradable, and the manufacturing process, being exothermic, is not energy intensive. Thus, the soil supplement is an environmentally friendly and cost effective means of healing arid, chemically polluted and minerally depleted lands.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A method of manufacturing a soil supplement comprising the following steps:
   (1) shredding waste cellulosic fibrous material, such as waste paper, to obtain a shredded fiber;
   (2) mixing the shredded fiber of step (1) with an agricultural wetting agent and a milk of lime until a temperature of about 120° F. to 140° F. is achieved to obtain a first mixture slurry the wetting agent being mixed with the shredded fiber at a ratio by weight of the wetting agent to the shredded fiber of about 0.001 to 1 up to 0.005 to 1, the milk of lime being mixed with the shredded fiber at a ratio by weight of a water component of the milk of lime to the shredded fiber of about 0.67 to 1 up to 1.34 to 1 and of a calcium oxide component of the milk of lime to the shredded fiber of about 0.15 to 1 up to 0.45 to 1;
   (3) mixing with the first mixture slurry of step (2) a material selected from the group consisting of silica diatomite plankton and non-swelling clay at a ratio by weight of the material to the shredded fiber of about 0.5 to 1 up to 1.5 to 1, to obtain a second mixture; and
   (4) mixing with the second mixture of step (3) a pH modifying substance in an amount sufficient to neutralize the second mixture to a pH of about 7 to obtain a finished soil supplement.

2. A method of manufacturing a soil supplement according to claim 1, further comprising: passing the shredded fiber from step (1) through a metal separator wherein any metal component in the shredded fiber is removed.

3. A method of manufacturing a soil supplement according to claim 1, wherein the waste cellulosic fibrous material is shredded to a size of about 500 to 1000 microns.

4. A method of manufacturing a soil supplement according to claim 1, wherein the pH modifying substance is selected from the group consisting of humic acid, fulvic acid, leonardite and lignite.

5. A method of manufacturing a soil supplement comprising the following steps:
   (1) shredding waste cellulosic fibrous material, such as waste paper, to a size of about 500 to 1000 microns to obtain a shredded fiber;
   (2) passing the shredded fiber from step (1) through a metal separator wherein any metal component in the shredded fiber is removed to obtain a demetalled shredded fiber;
   (3) mixing the demetalled shredded fiber of step (2) with an agricultural wetting agent, calcium oxide, and water at a ratio by weight of the wetting agent to the demetalled shredded fiber ranging from about 0.001 to 1 up to 0.005 to 1, of the water to the demetalled shredded fiber ranging from about 0.67 to 1 up to 1.34 to 1, and of the calcium oxide to the demetalled shredded fiber ranging from about 0.15 to 1 up to 0.45 to 1, until a temperature of about 120° F. to 140° F. is achieved to obtain a first mixture slurry;
   (4) mixing with the first mixture slurry of step (3) a material selected from the group comprising silica diatomite plankton and non-swelling clay at a ratio by weight of the material to the demetalled shredded fiber ranging from about 0.5 to 1 up to 1.5 to 1 to obtain a second mixture; and
   (5) mixing with the second mixture of step (4) a pH modifying substance selected from the group consisting of humic acid, fulvic acid, leonardite and lignite in an amount sufficient to neutralize the second mixture to a pH of about 7 to obtain a finished soil supplement.

6. A soil supplement, comprising:
   (a) a waste cellulosic fibrous material, such as waste paper;
   (b) an agricultural wetting agent at a ratio by weight of the wetting agent to the fibrous material ranging from about 0.001 to 1 up to 0.005 to 1;
   (c) water at a ratio by weight of the water to the fibrous material ranging from about 0.67 to 1 up to 1.34 to 1;
   (d) calcium oxide at a ratio by weight of the calcium oxide to the fibrous material ranging from about 0.15 to 1 up to 0.45 to 1;
   (e) a material selected from the group consisting of silica diatomite plankton and non-swelling clay at a ratio by weight of the material to the fibrous material ranging from about 0.5 to 1 up to 1.5 to 1; and
   (f) a pH modifying substance in an amount sufficient to adjust the pH of the soil supplement to a value of about 7.

7. A soil supplement according to claim 6, wherein the fibrous material is shredded to a size of about 500 to 1000 microns.

8. A soil supplement according to claim 6, wherein the pH modifying substance is selected from the group consisting of humic acid, fulvic acid, leonardite and lignite.

9. A soil supplement, comprising:
   (a) a waste cellulosic fibrous material, such as waste paper, shredded to a size of about 500 to 1000 microns;
   (b) an agricultural wetting agent at a ratio by weight of the wetting agent to the fibrous material ranging from about 0.001 to 1 up to 0.005 to 1;
   (c) water at a ratio by weight of the water to the fibrous material ranging from about 0.67 to 1 up to 1.34 to 1;
   (d) calcium oxide at a ratio by weight of the calcium oxide to the fibrous material ranging from about 0.15 to 1 up to 0.45 to 1;
   (e) a material selected from the group consisting of silica diatomite plankton and non-swelling clay at a ratio by weight of the material to the fibrous material ranging from about 0.5 to 1 up to 1.5 to 1; and
   (f) a pH modifying substance selected from the group consisting of humic acid, fulvic acid, leonardite and lignite in an amount sufficient to adjust the pH to a value of about 7.

* * * * *